Dec. 5, 1961 R. T. MYERS ET AL 3,012,138

AUDIO AMPLIFIER

Filed June 17, 1959 2 Sheets-Sheet 1

Richard T. Myers
Harley C. Wintle
INVENTORS

BY Joseph P. Kates
ATTORNEY

Richard T. Myers
Harley C. Wintle
INVENTOR.

BY Joseph P. Kates
ATTORNEY

United States Patent Office 3,012,138
Patented Dec. 5, 1961

3,012,138
AUDIO AMPLIFIER

Richard T. Myers, Lynchburg, Va., and Harley C. Wintle, North Syracuse, N.Y., assignors to General Electric Company, a corporation of New York Filed June 17, 1959, Ser. No. 820,998
15 Claims. (Cl. 250—20)

The present invention relates to an audio amplifier and more particularly relates to an audio amplifier incorporating a squelch circuit which can substantially eliminate noise from appearing at the receiver speaker in the absence of an audio or voice signal (talking) coming through and wherein the circuit will operate despite variations over a comparatively wide range of temperature conditions.

Prior art systems comprise principally tube systems which do not have a squelch system which is adaptable for an all-transistorized receiver such as is provided in the present invention. Where available, prior art transistorized power amplifiers for transistorized receivers do not incorporate squelching techniques which can provide the sharp cut-off which is desirable, for example, in a mobile or portable two-way radio adaptation. In prior art systems noise output is taken from the limiter and filtered. The filtered noise is applied to a single stage of amplification and the noise is then used to control the bias of the audio amplifier in accordance with level such that sharp cut-off or switching off and on of audio amplification is not possible. Instead there is a gradual transition in the presence of noise which depends upon noise level. Prior art systems also do not perform satisfactorily over varying ambient conditions of temperature and require continuous adjustment of the squelch adjustment control. This is an annoying feature to the user. Such annoyance is hazardous in vehicles because it detracts the attention of a driver. In addition, some messages can be lost while the driver of the vehicle or the operator of a portable unit manipulates the control adjustment and has his attention distracted.

Accordingly, an object of the present invention is to provide a means and a method for audio amplification and squelch especially suitable for two-way radio applications, which will provide sharp switching from amplifying to cut-off conditions and which will operate satisfactorily over substantially the range of variations of ambient temperature and line voltage encountered in operating such equipment.

Another purpose of the present invention is to provide a squelch circuit for an audio amplifier wherein cut-off and restoration of operation may be made very sharply and quickly and wherein need for adjustment of the squelch control with variations in temperature will be substantially eliminated.

Another aim of the present invention is to provide a combination audio amplifier and squelch circuit wherein substantial elimination from noise will be effected almost instantaneously in the absence of actual talking over the system and which may be utilized effectively with a receiver such as an FM receiver.

Another object of the present invention is to provide a circuit for a substantially all-transistorized audio receiver and which will be especially adaptable for a two-way mobile or portable radio applications where low power drain is an important factor in the circuit design.

While the novel and distinctive features of the invention are particularly pointed out in the appended claims, a more expository treatment of the invention, in principle and in detail, together with additional objects and advantages thereof is afforded by the following description and accompanying drawing in which:

Figure 1:
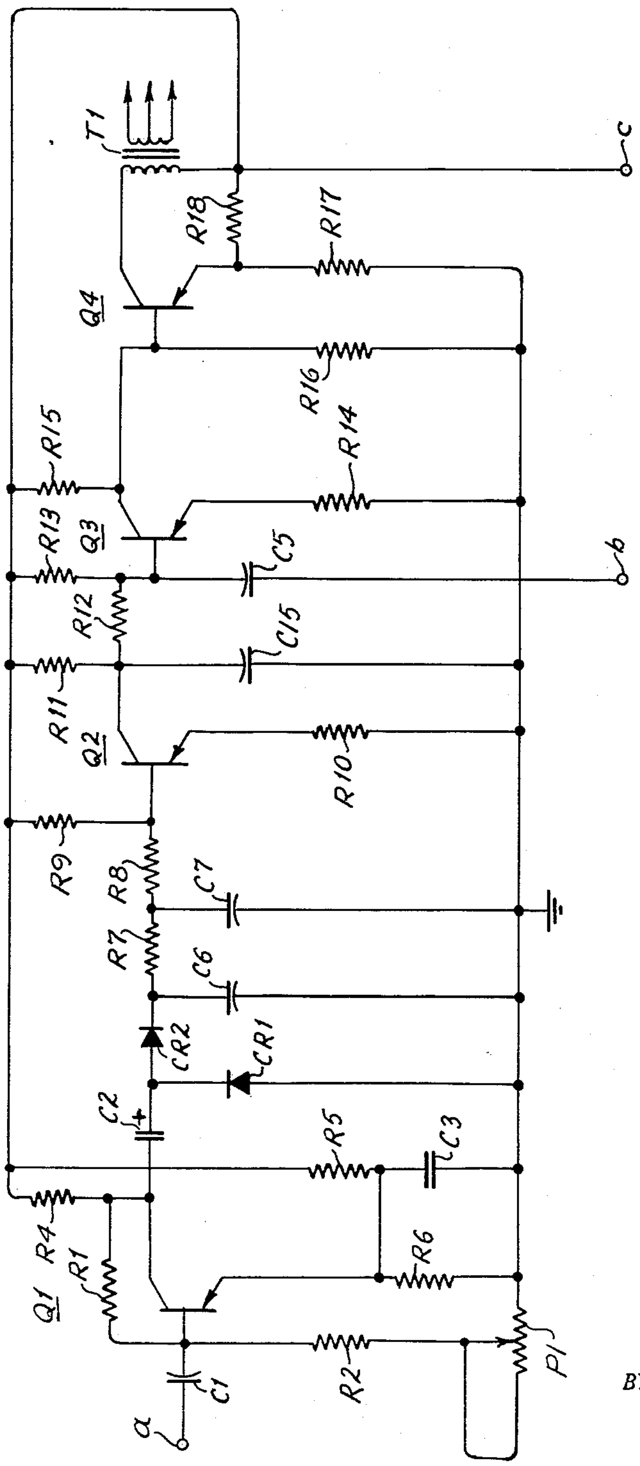
FIG. 1 is a schematic representation of a first embodiment of a noise amplifier and audio circuit illustrative of the apparatus and method of the present invention.

Now referring to FIG. 1 of the drawings, input from the discriminator (not shown) in an FM receiver is applied both to the noise input terminal *a* and through the audio input terminal *b*. The input at terminal *a* is applied through a coupling capacitor C1 to a first noise amplifier stage Q1 which comprises a transistor. Transistor Q1 is a PNP transistor having an emitter, a base and a collector. Disposed between the base and ground of transistor Q1 is a resistor R2 and a potentiometer P1 in series. Potentiometer P1 provides squelch control and includes a sliding contact arm to set the level at which squelch action occurs. On correct setting of potentiometer P1 the apparatus of FIG. 1 will achieve a 60 decibels (db) reduction in the absence of voice or audio signals. Disposed between a source of negative voltage C which may be of the order of −12 volts (minus twelve volts) and the base of transistor Q1 is respectively, a collector load resistor R4 and a voltage divider resistor R1. The collector of transistor Q1 is electrically tied to the junction between resistors R1 and R4. Disposed in parallel between the emitter of transistor Q1 and ground is an emitter resistor R6 and a bypass capacitor C3. Emitter resistor R6 provides bias stabilization. A resistor R5 is disposed between the negative 12 volt supply C and the junction of the emitter of transistor Q1 and resistor R6. Resistors R1 and R4 form a voltage divider for proper collector and base voltage of transistor Q1 together with resistor R2 and potentiometer P1, one end of potentiometer P1 being grounded. Capacitors C3, C1 and a capacitor C2 to be described bypasses noise frequencies. These capacitors may be made of relatively small value to afford such bypass. A D.C. amplifier stage Q2 is provided which stage is responsive to output of noise amplifier stage Q1 and comprises a PNP transistor. Transistor Q2 has a collector, a base and an emitter. Disposed between the collector of transistor Q1 and the base of transistor Q2 is in series a coupling capacitor C2, a rectifier CR2, a first filter resistor R7 and a second filter resistor R8. The plate or anode of rectifier CR2, which rectifier is a germanium diode, is directly connected to the plate of capacitor C2 opposite its transistor Q1 collector connected plate. Another rectifier CR1 which is a germanium diode, is disposed between ground and the plate of capacitor C2 opposite that plate tied to the collector of transistor Q1 that is at the junction between rectifier CR2 and coupling capacitor C2. The plate or anode of rectifier CR1 is connected to ground. A filter is provided between the cathode of rectifier CR2 and the base of transistor Q2 and comprises a $\pi$ (pi) network comprising a capacitor C6 disposed between the cathode of diode CR2 and ground, resistor R7 tied to the cathode of rectifier CR2, a second capacitor C7 disposed between the connection of resistor R7 and resistor R8 and ground, and resistor R8 between the base of transistor Q2 and resistor R7. That is, resistors R7 and R8 in conjunction with capacitors C6 and C7 form a pi network filter. A resistor R9 is provided between the negative 12 volt supply C and the base of transistor Q2. Resistor R9 provides a constant current source to turn stage Q2 on. Between the emitter of transistor Q2 and ground is an emitter resistor R10 to provide temperature stability. A third transistor stage Q3 comprises the first audio amplifier. The transistor Q3 includes a collector, a base and an emitter. Disposed between the emitter and ground is a resistor R14. Audio input is applied from audio input source *b* from the volume control in the receiver (not shown) through coupling capacitor C5 to the base of transistor Q3. Disposed between the negative 12 volt supply source C and the base of transistor Q3 is in series a resistor R11 and a resistor R12, the junction between resistors R11 and R12 being tied to the collector of transistor Q2. Resistor R11 is the collector load resistor for stage Q2. A decoupling capacitor C15 which is of the order of 15 microfarads ($\mu$f.) is provided between the collector of transistor Q2 and ground to remove any traces of noise from coming through. A resistor R15 is provided between the negative volt source C and the collector of transistor Q3. An emitter resistor R14 is disposed between the emitter of transistor Q3 and ground. As stated, an input coupling capacitor C5 is disposed between audio input source *b* and the base of first audio stage Q3. Disposed between the negative source C and the base of transistor Q3 is a resistor R13. Resistors R12 and R13 are joined to each other and their junction electrically connected to the base of transistor Q3. Resistors R13 and R12, stage Q2 and resistor R10 together form a bleeder such that proper voltage will appear at the junction between resistor R12 and R13 to cause class A current flow through transistor Q3 when audio signal is present and amplification of a signal coupled into the base of transistor Q3 is desired. With noise and no audio saturation, current flow through transistor Q3 occurs because of the voltage at the collector of stage Q2. A fourth audio driver transistor stage comprising a transistor Q4 is provided which may have a collector, an emitter, and a base. A base resistor R16 is disposed between the base of transistor Q4 and ground. A resistor R15 is disposed in series with resistor R16 and is disposed between the negative voltage supply source C and the junction between the collector of transistor Q3 and the base of transistor Q4. The base of transistor Q4 is electrically connected directly from the collector of transistor Q3 and as stated to the junction between stage Q3, collector load resistor R15 and bias resistor R16. Resistor R16 provides proper bias for the base of transistor Q4. The emitter of transistor Q4 is electrically tied to ground through a small value resistor R17. A bleeder resistor R18 is disposed between the negative source of voltage C and the emitter of transistor Q4 and together with emitter bleeder resistor R17 form a bleeder to regulate the transistor Q4 emitter voltage between the negative volt source C and ground. Disposed between the negative volt source C and the collector of transistor Q4 is a primary of an audio transformer T1. The secondary of transformer T1 couples output from transistor Q4 to drive a class B amplifier (not shown) with a 300 milliwatt output to the speaker.

Operation of the circuit of FIG. 1 is as follows:

In the absence of audio (speech) noise from the frequency discriminator is coupled through capacitor C1 to the base of stage Q1 and the noise is amplified by stage Q1 to provide an amplified noise output. The noise signal amplified through noise amplifier Q1 is then coupled through capacitor C2 where the amplified noise signal is rectified by the diodes CR1 and CR2. Diodes CR1 and CR2 which are germanium diodes, for example, provide full wave rectification. As stated hereinabove, the cathode of diode CR1 is in the circuit shown in FIG. 1 connected to coupling capacitor C2 and the anode of diode CR2 is connected to the coupling capacitor C2. On the negative peaks the cathode of diode CR1 will swing negative and, therefore, electron current flow will flow through the diode CR1 to ground charging the right hand side plate of capacitor C2. Capacitor C2 is labeled plus at its right hand plate to represent this condition. On the next half cycle the positive peaks of current coming through will cause electron current to flow from the negative 12 volt supply C through resistors R9, R8 and R7 and through the diode CR2 to discharge capacitor C2. Rectifiers CR1 and CR2 thus provide full wave rectification and act as a voltage doubler to cause a positive D.C. voltage to appear at the base of transistor Q2. Resistors R7, R8 and capacitors C6 and C7 provide filtering action removing the ripples of the charging and discharging currents from coupling capacitor C2, thereby providing a relatively steady D.C. voltage at the base of transistor Q2 when noise without audio (speech) appears at the noise input terminal *a* of stage Q1. In this condition since the positive voltage at the base of D.C. amplifier stage transistor Q2 approaches the ground voltage to which the emitter of stage Q2 is tied there will be approximately zero difference in potential across the input diode (emitter to base) and, therefore, conduction will not take place through transistor Q2. Therefore, current flow will not occur through resistor R11 or through resistors R13 and R12 because of the fact that transistor Q2 is non conductive. Hence, the base of transistor Q3 will be at a relatively negative potential approaching voltage source C voltage. Under this condition the input diode between the base and the emitter of the PNP transistor Q3 will have a difference of potential thereacross and heavy conduction will occur through transistor Q3. This will cause a relatively positive going voltage to appear at the collector because of heavy conduction through resistor R15 which will in turn cause a positive voltage to appear at the base of transistor Q4. With the relatively positive voltage appearing at the base of transistor Q4, the input diode between its emitter and base will not have an appreciable difference in potential thereacross and hence transistor Q4 will not conduct heavily. That is transistor Q4 will be substantially non conductive or cut off. Under these circumstances substantially no swing in voltage will appear across the primary of transformer T1 and hence there will be silence at the speaker (substantially zero output).

In the presence of audio (speech) the action of the limiters (not shown) which precede the discriminator (not shown) causes the noise output to decrease. In the absence of noise, therefore, comparatively low noise signal energy is coupled through coupling capacitor C1 to the base of transistor Q1. Hence, there is no appreciable change in conduction through transistor Q1. Under such conditions there is appreciably no signal to be rectified by diodes CR1 and CR2 and hence a substantially negative D.C. voltage will appear at the base of transistor Q2. With the negative voltage at the base of transistor Q2 there will be a voltage difference at the input diode or between its emitter and base and appreciable current flow will occur through transistor Q2. This current flow through transistor Q2 will cause the base of transistor Q3 to become relatively positive, thereby, lowering the difference in potential between the emitter and base of transistor Q3 (input diode) such that conduction through transistor Q3 will be lowered. That is, with transistor Q2 conducting an appreciable current flow will occur through resistors R11 and R13 thence, through transistor Q2 and through emitter resistor R10 to ground. This will cause a relatively positive voltage (compared to minus 12 volts and nearer ground potential which is the highest position here) to appear at the base of transistor Q3 which will reduce the conduction of transistor Q3. The function of resistor R12 is to set the point of operation such that in the absence of noise, some conduction occurs through transistor Q3 thereby providing a collector voltage at transistor Q3 which is directly coupled to the base of transistor Q4. This provides less current flow through resistor R15 and due to this lessened current flow through transistor Q3 the base of transistor Q4 swings toward the negative direction. This causes a greater difference in potential across the input diode between the base and emitter of transistor Q4 which permits heavy conduction to occur through transistor Q4. Restated, transistor stage Q3 is now biased out of saturation and transistor Q4 may be biased above cut-off. Now in the presence of signals from audio input source A representing talking, such signals are coupled through capacitor C5 to the base of the PNP transistor Q3. Since transistor Q3 can conduct further (since it is not in saturated condition at this time) this audio signal is amplified by transistor stage Q3 and the stage 3 amplified signal is directly coupled to the base of transistor Q4. Since transistor Q4 is now in conductive state the signal will be developed across its collector load comprising the primary of transformer T1 and the signal across the primary of transformer is coupled to the secondary of transformer T1 and to the output such that the talking (audio) will be heard. That is upon audio, the noise input from the discriminator (not shown) will be lessened causing the audio stages Q3 and Q4 to be biased such that the circuit is operative for readily receiving audio signals and coupling them to the speaker.

Figure 2:
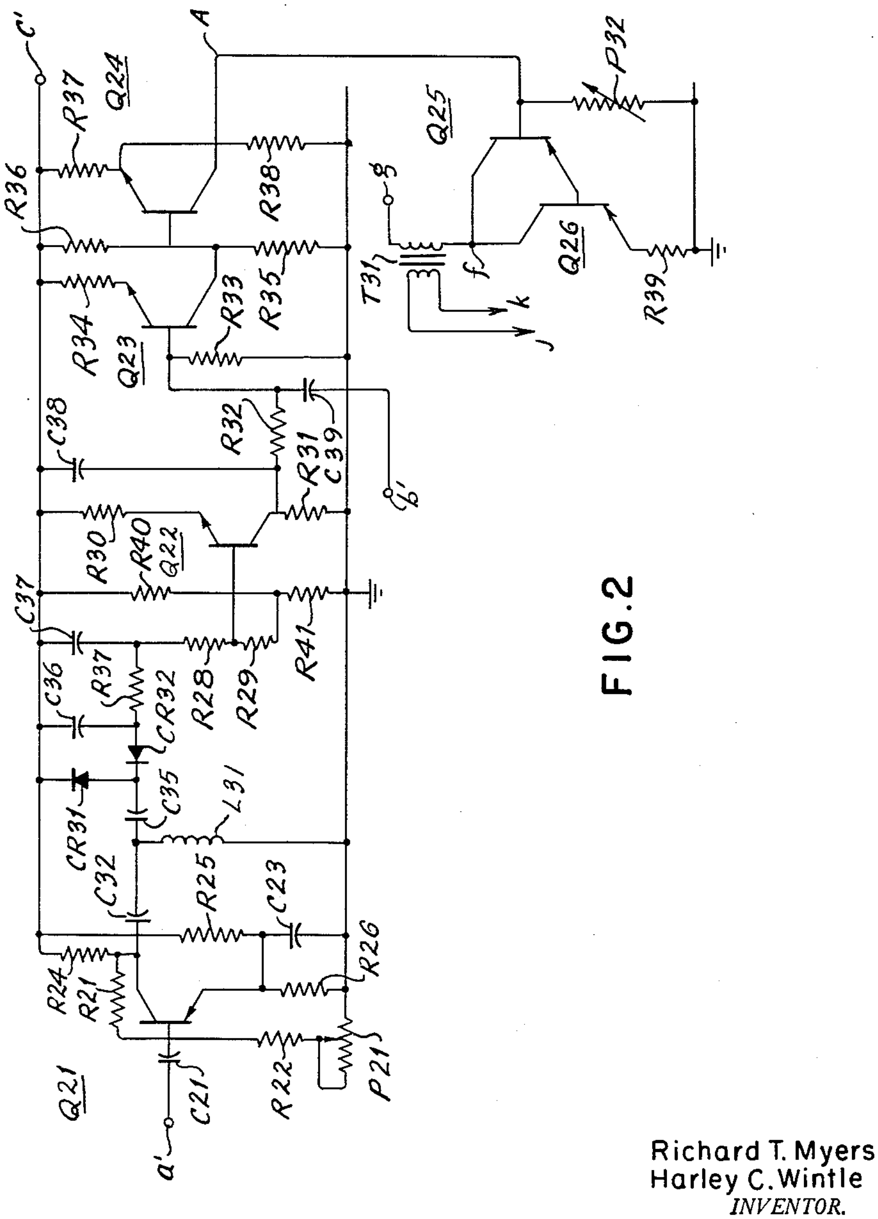
FIG. 2 is a schematic representation of another embodiment of the noise amplifier and audio circuit illustrative of the apparatus and method of the present invention.

Now refer to FIG. 2 of the drawings wherein a modification of the circuit of FIG. 1 is shown. In the embodiment of FIG. 2 NPN transistors are shown used for the D.C. amplifier Q22, first audio Q23 and audio driver Q24 stages. This embodiment also illustrates incorporation of additional features, for example, where additional amplification is desirable. An optional feature is provided by PNP transistors Q25 and Q26 in a circuit somewhat similar to a type known as "Darlington." Referring to FIG. 2 in detail, a noise amplifier stage Q21 is provided which comprises a PNP transistor having a collector, an emitter and a base. Noise input from a terminal *a'* is applied through coupling capacitor C21 to the base of transistor Q21. A voltage divider comprising resistors R24, R21 and R22 and potentiometer P21 is disposed between source of voltage which is a negative twelve volt (−12 volt) source C' and ground to provide desired collector and base voltages for transistor stage Q21. Squelch control potentiometer P21 serves the same function in the device of FIG. 2 as the squelch control potentiometer P1 of the device of FIG. 1. An emitter resistor P26 is disposed between the emitter of transistor Q21 and ground and a bypass capacitor C23 is disposed across emitter resistor R26. Disposed between the source of negative voltage C' and ground is a voltage divider comprising a resistor R25 and emitter resistor R26 to provide for proper emitter voltage for operation of stage Q21. A filter comprising capacitor C32 and inductor L31 is disposed between the collector of stage Q1 and ground and is of value (C32 may equal 3300 micromicrofarads and L31 may be of the order of 300 millihenries) such that high frequencies beyond the 300 cycle range are passed and noise and audio frequency below that 3000 cycle frequency is bypassed to ground. Under these circumstances energy of approximately 6000 cycles frequency is utilized to operate the squelch control of a receiver in which the apparatus of FIG. 2 is incorporated. A coupling capacitor C35 is connected at the junction of capacitor C32 and inductor L31 on one side. A full wave rectifier comprises a first and second crystal CR31 and CR32, crystal CR31 being disposed between the negative 12 volt supply C' and the cathode of crystal CR32. The cathode of crystal CR1 is electrically tied to the negative 12 volt supply C' and its anode is connected to the junction which is made between the plate of capacitor C35 opposite its capacitor C32 connected plate and the anode of crystal CR31. The anode of crystal CR31 thus is connected to the cathode of diode CR32. Diodes CR31 and CR32 are preferably silicon diodes although germanium or other diodes might be used. A filter is provided comprising capacitor C36, capacitor C37 and resistor R37. Capacitor C36 is connected between the voltage source C' and the anode of diode CR32. Capacitor C37 is connected at one plate to source C'. A resistor R37 is provided. It connects the plates of capacitors C36 and C37 opposite their voltage source C' connected plates. The filter comprising resistor R37 and capacitors C36 and C37 (and resistor R28) smooths the D.C. output of full wave rectifier CR31 and CR32. A D.C. amplifier stage Q22 is provided which comprises an NPN transistor. Transistor Q22 has an emitter, a base and a collector. Disposed between the collector of transistor Q22 and ground is a collector load resistor R31. Disposed between the output anode side of rectifier CR32 and ground are the filter resistor R37, coupling and filter resistor R28, a voltage dropping resistor R29 and a bleeder resistor R41 in series. Tied to the connection between resistor R29 and resistor R41 is one end of a resistor R40. Resistor R40 has its other end connected to source C'. To protect against possible variations in supply voltage from source C' at the point between resistors R40 and R41 which form a voltage divider or bleeder, voltage is applied to the base of transistor Q22 through voltage dropping resistor R29. This insures appliance of proper bias to the base of transistor Q22. Thus is provided necessary forward bias across the input diode between the base and the emitter of transistor Q22 to cause it to conduct. Resistor R28 serves the dual function of providing decoupling resistance and of an additional needed resistance for the filter comprising resistors R37 and R28 and capacitors C36 and C37. An emitter resistor R30 is disposed between the emitter of the D.C. amplifier Q22 and the source C'. Due to fluctuations in the line voltage from source C' the voltage divider comprising resistors R40 and R41 is provided to present proper voltage at the junction and resistor R29 is provided to drop the voltage from the bleeder to required base bias voltage of transistor Q2. Line voltage affects the operation of the limiter (not shown), the discriminator (not shown) and the noise amplifier Q21. By provision of resistors R40, R41 and R29 compensation is made for variations in the line voltage which occur in the receiver at these points. Capacitor C38 provides additional noise bypass such that spikes of noise occurring will be bypassed to the voltage source C' and to ground. A first audio stage responsive to audio input and to the output of the D.C. amplifier Q22 is provided and comprises a transistor Q23. Transistor Q23 has an emitter, a collector and a base. From the collector of stage Q22 D.C. coupling is effected through resistor R32 to the base of transistor Q23. Resistors R32 and R33, the latter being disposed between the base of transistor Q23 and ground provide for proper bias at the base of transistor Q23. A coupling capacitor C39 is provided to couple audio input (talking) from the discriminator through audio input terminal *b'*. An emitter resistor R34 is provided between the source C' and the emitter of transistor Q23. An output collector load resistor R35 is disposed between the collector of transistor Q23 and ground. Resistor R35 together with a resistor R36 in series therewith also provide for a voltage bleeder bias to be applied at the base of a following or responsive transistor Q24. That is, an audio driver stage Q24 which is a NPN transistor having an emitter, a collector and a base is provided. Disposed between the emitter of transistor Q24 and the source C' is an emitter resistor R37. A resistor R38 is disposed between the emitter of transistor Q24 and ground, resistors R37 and R38 together forming a voltage divider circuit to insure proper voltage at the emitter of stage Q24. As stated, proper base bias voltage for stage Q24 is provided at the junction between bleeder resistors R35 and R36. Additional power amplification is provided by a circuit similar to the type known as the "Darlington" compound type comprising transistors Q25 and Q26 each of which transistors has a collector, a base and an emitter. The output from the collector of audio driver Q24 may be directly coupled to the base of transistor Q25. A variable resistor which may be a rheostat P32 is provided and disposed between the base of transistor Q25 and ground. Rheostat P32 is adjusted to provide required forward bias for stage Q25 and, therefore, for the amount of power output or power capability. The emitter of stage Q25 is directly connected to the base of stage Q26 and the collectors of transistors Q25 and Q26 is joined together at a point *f*. An emitter resistor R39 is provided between the emitter of stage Q26 and ground. Disposed between a voltage source *g* which may be of the order of −13.8 volts and point *f* at the junction between the collectors of stages Q25 and Q26 is the primary of an output audio transformer T31 the secondary of which is connected to the speaker from output secondary inductor connections *j* and *k*. This arrangement is preferable where intended for a speaker of the order of a two watt power handling class A speaker wherein greater power is required than in the speaker more readily usable with device shown in FIG. 1. That is the additional power amplification of the circuit of FIG. 2 can be effectively utilized in a mobile unit as compared with the more effective use of the circuit of FIG. 1 with apparatus requiring lower power amplification as for example, in a portable receiver.

In operation assuming that no talking is occurring and audio input is not being applied through input *b'*, noise from the discriminator will be applied through input *a'*. This noise will be coupled through capacitor C21 causing transistor Q21 to amplify the noise which noise will be coupled through capacitors C32 and C35. The noise coupled through capacitor C32 will be filtered by means of the filter comprising capacitor C32 and inductor L31 such that noise in frequencies lower than 3000 cycles will be bypassed to ground. Capacitor C32 and inductor L31, form a series resonant circuit tuned to about 6000 cycles such that frequencies appreciably lower will be bypassed and the approximately 6000 cycle noise frequencies will be passed and coupled through capacitor C35. Full-wave rectification will occur by means of the diodes CR31 and CR32 and the D.C. output of the diodes will be filtered by the filter comprising resistor R37, capacitor C36, and capacitor C37 such that a D.C. voltage will be applied through resistor R28 to the base of the D.C. amplifier stage Q22. The rectifier diodes CR31 and CR32 provide a negative going output. When noise is present (in the absence of audio) this causes the difference in potential across the input diode from the emitter to the base of transistor Q22 to be lowered. The lowered input diode potential difference causes substantially lower current flow through stage Q22. The lowered current flow through transistor Q22 causes the voltage at its collector to increase which increased voltage is directly coupled through resistor R32 to the base of the first audio stage Q23. The higher voltage at the base of stage Q23 causes stage Q23 to conduct more heavily causing a decrease in voltage at its collector. This decreased voltage at the collector of first audio stage Q23 is then coupled directly to the base of audio driver stage Q24 which will cause audio driver stage Q24 to conduct less heavily. The more negative voltage at the base of the audio driver stage Q24 will cause less difference in potential across the input diode between its emitter and base and, therefore, audio driver stage Q24 will have less current flow therethrough. Actually the direct-coupled lowering of voltage is sufficient to cause NPN transistor Q24 to become cut-off in the presence of noise and in the absence of audio input. Therefore, there will be appreciably no output coupled to the base of stage Q25. Hence, no audio output will be developed across the primary of transistor T11 and there will be silence at the speaker. It should be noted that the squelch control potentiometer P21 as in the device of FIG. 1 should be adjusted in the absence of audio and in the presence of noise such that there is approximately zero noise heard at the output in the absence of audio. However, the adjustment should be effected to a point just before the noise comes on very loudly. This positioning of potentiometer P21 is very important. The positioning at this setting of the potentiometer P21 is made so as not to affect the gain and yet insure that squelch action will occur. As stated hereinabove, the inventive circuit is constructed such that changes in temperature and in line voltage do not change the squelch action and resetting of the squelch control need not be effected over a comparatively wide range of such ambient line voltage and temperature conditions.

In the presence of audio (voice) input plus noise the noise received at the noise input terminal *a'* will be appreciably less. The filter comprising capacitor C32 and inductor L31 bypasses the voice frequencies and with substantially no noise coming through there will be no noise to be rectified across the diodes CR31 and CR32. Therefore, the negative voltage applied to the base of transistor Q22 in the presence of noise without audio will not appear. Under such conditions transistor Q22 will conduct heavily causing a lowering of voltage at the collector connected end of resistor R31 which lowering of voltage will cause the current flow in stage Q23 to be appreciably lowered. That is, lowering of voltage at the collector of stage Q22 causes transistor stage Q23 to conduct less in the presence of noise. Under such circumstances upon audio input being coupled through coupling capacitor C39 and applied to the base of stage Q23 amplification of the input audio signal by stage Q23 is permitted. The amplified voice signal is then applied to the base of transistor Q24 where the voice signal is further amplified. Still further amplification may take place in the circuit of stages Q25 and Q26 and the output of the last two stages may be coupled by the primary of transformer T31 to its secondary and thence to the speaker.

In the presence of noise when there is no audio, stage Q23 is driven into current saturation which means that additional noise coupled from the inputs through stage Q23 will have no effect on the stage. However, in the absence of noise, stage Q3 comes out of saturation substantially immediately which permits the sharp switching action to take place whereby when audio input is coupled through capacitor C39 a signal is substantially immediately coupled therethrough to stage Q4 for amplification therein. This is followed by further amplification in stages Q25 and Q26 and coupling to the speaker from secondary terminals *j* and *k*. The addition of stages Q25 and Q26 permits operation of a 2 watt class A speaker in applications where more power is required than afforded by the embodiment of FIG. 1 without such additional amplification or if the FIG. 2 embodiment was used without stages Q25 and Q26.

While in nowise to be considered as limiting the scope of the invention a table of values for a successfully tested embodiment of each of the devices of FIGS. 1 and 2 is given hereinbelow:

FIG. 1

*Component*

| Capacitor: | Value |
|---|---|
| C1 | .01 μf. |
| C2 | .05 μf. |
| C3 | .22 μf. |
| C5 | 5 μμf. |
| C6 | 15 mf. |
| C7 | 15 mf. |
| C15 | 15 μμf. |
| **Resistors:** | **Ohms (Ω)** |
| R1 | 22K |
| R2 | 8.2K |
| R4 | 4.7K |
| R5 | 6.2K |
| R6 | 2.2K |
| R7 | 470 |
| R8 | 180 |
| R9 | 75K |
| R10 | 180K |

FIG. 1—Continued

| Resistors—Continued | Ohms (Ω) |
|---|---|
| R11 | 15K |
| R12 | 2.2K |
| R13 | 33K |
| R14 | 680 |
| R15 | 5.6K |
| R16 | 18K |
| R17 | 820 |
| R18 | 6.8K |

| Potentiometer: | Value |
|---|---|
| P1 | 10KΩ |

FIG. 2

*Component*

| Capacitor: | Value |
|---|---|
| C21 | .02 μf. |
| C23 | .22 μf. |
| C32 | 3300 μμf. |
| C35 | .047 μf. |
| C36 | 5 mf. |
| C37 | 5 mf. |
| C38 | 10 μf. |
| C39 | .01 μf. |

| Resistors: | Ohms (Ω) |
|---|---|
| R21 | 22K |
| R22 | 8200 |
| R24 | 6200 |
| R25 | 6200 |
| R26 | 2.2K |
| R27 | 330 |
| R28 | 180 |
| R29 | 68K |
| R30 | 180 |
| R31 | 15K |
| R32 | 2200 |
| R33 | 33K |
| R34 | 680 |
| R35 | 3300 |
| R36 | 18K |
| R37 | 2000 |
| R38 | 3900 |

| Potentiometer: | Value |
|---|---|
| P21 | 15KΩ |
| Rheostat: | |
| P32 | 1500Ω |
| Transistor: | |
| Q21 | 2N450 |
| Q22 | 2N169 |
| Q23 | 2N169 |
| Q24 | 2N169 |
| Diode: | |
| CR31 | IN625 |
| CR32 | IN625 |

While a specific embodiment of the invention has been shown and described, it should be recognized that the invention should not be limited thereto. It is accordingly intended in the appended claims to claim all such variations as fall within the true spirit of the invention.

What is claimed is:

1. An audio amplifier comprising a plurality of stages of amplification, and means to permit amplifier output only during reception of audio input, said means to permit audio input only during audio input reception comprising means responsive upon noise energy input to bias one of said stages of amplification to current saturation to thereby prevent amplification of audio input into the first of said stages of amplification and means responsive to current saturation of said first stage of amplification to bias a succeeding stage to substantially cut-off condition.

2. In an audio amplifying and squelch circuit arrangement, the combination comprising amplifying means adapted to receive an audio input signal, switching means coupled to said amplifying means for providing a sharp transition between amplifying and non-amplifying conditions, said switching means including further means for amplifying input noise signals, rectifying means for producing a unidirectional electrical signal in response to amplified noise signals, biasing circuit means for establishing a biasing voltage for said first named amplifying means to maintain it in an amplifying condition whenever the noise signal falls below a predetermined level, means coupling the unidirectional voltage from said rectifying means to said biasing means for varying the biasing voltage and driving said amplifying means into a saturated and non-amplifying condition whenever the noise signal rises to a predetermined level.

3. A transistorized audio amplifier and squelch circuit to provide sharp switching from amplifying to cut-off conditions and which is insensitive to wide variations in temperature, said circuit comprising an audio driver stage, a first audio stage, said audio driver stage being responsive to output from said first audio stage to amplify audio signals therefrom, a D.C. amplifier and a noise amplifier responsive to noise input to amplify said noise input, each of said stages comprising a transistor having a collector, a base and an emitter, said first audio stage being biased such that when said D.C. amplifier is conducting, said first audio stage will amplify audio signals fed into it, a voltage divider comprising a first audio stage collector load resistor and an audio driver base resistor, a source of D.C. voltage, said audio collector load resistor and said audio driver base resistor being connected in series and disposed between said source and ground, the junction between said resistors being connected to said audio driver base, the D.C. voltage at the collector of said first audio thereby being such that when said first audio stage is conducting at a point below saturation said audio driver is biased by said collector and base resistors to permit amplification of said audio driver stage and means to rectify the output of said noise amplifier, said rectified output being applied to said D.C. amplifier to thereby cause operation of said D.C. amplifier so as to provide a voltage at the output of said D.C. amplifier to drive said first audio stage into saturation to thereby prevent operation of said first audio stage in the presence of noise.

4. An audio amplifier and squelch circuit comprising an audio stage, means for applying audio input signals to said audio stage, a D.C. amplifier stage having input and output circuit means, means coupling the output circuit means of said amplifier stage to said audio stage for controlling said audio stage and selectively biasing it into and out of saturation in response to the output voltage level of said D.C. amplifier, said last named means including noise input means, means for rectifying said noise input, and means coupling said rectified noise to said D.C. amplifier for amplification thereby to produce said selective biasing voltage levels.

5. The apparatus of claim 4 including means disposed between said noise input means and said rectifying means to selectively pass noise frequency energy and bypass audio frequency energy to ground.

6. In an audio amplifying and squelch circuit arrangement, the combination comprising amplifying means adapted to receive an audio input signal, switching means coupled to said amplifying means for providing a sharp transition between amplifying and non-amplifying conditions, said switching means including noise amplifying means for amplifying input noise signals, rectifying means for producing a unidirectional electrical signal of a given polarity and magnitude in response to said noise signal, biasing means for said first named amplifying means for producing a biasing voltage to maintain said first named amplifying means in an amplifying condition whenever the noise signal remains below a predetermined level, means coupling the unidirectional voltage from said rectifying means to said biasing means, the polarity and magnitude of said unidirectional signal controlling said biasing means whereby said biasing voltage is varied and said amplifying means is driven into a saturated and non-amplifying condition whenever the noise signal rises above said predetermined level.

7. An audio amplifier and squelch circuit comprising a noise amplifying stage, a D.C. amplifier stage, a first audio stage and an audio driver stage, each of said stages including a transistor having collector, base, and emitter electrodes, means to apply noise input signals to the base electrode of said noise amplifier, means to apply audio input to the base electrode of said first audio stage, biasing means for said first audio stage including said D.C. amplifier stage for maintaining said audio stage in a non-saturated condition whenever the output of said amplifier is at a predetermined level, means coupling the output of said D.C. amplifier stage to said first audio stage whereby said biasing means maintains said audio stage in a saturated condition whenever the output of said D.C. amplifier rises above said predetermined level.

8. The apparatus of claim 7 including a source of voltage, a first and a second audio driver input bleeder resistor, said first resistor being disposed between said collector of said first audio stage and said source of voltage, said second resistor being disposed between the base of said audio driver stage and ground, said first audio stage when in current saturated condition causing increased collector current to flow through said first resistor to thereby cut-off said audio driver stage by lowering the difference in potential across the input diode of said audio driver between its base and emitter below the cut-off point.

9. In a receiver an audio amplifier and squelch circuit comprising a noise amplifier stage, a D.C. amplifier stage, a first audio stage, and an audio driver stage, each of said stages comprising a transistor having an emitter, a base and a collector, said emitter to base portion comprising the input diode of each of said transistors, said noise amplifier stage comprising a PNP transistor, each of said D.C. amplifier, said first audio and said audio driver stages comprising an NPN transistor, a compound transistor amplifier stage responsive to output of said audio driver, means to apply input from the receiver both to said noise amplifier and to said first audio stage, a rectifier and a filter disposed between the output of said noise amplifier and the input of said D.C. amplifier stage to rectify and filter noise amplifier stage output, said first audio stage being responsive to said D.C. amplifier output, means to bias said first audio stage across its input diode such that it will act as an audio amplifier when said D.C. amplifier is conducting, means to bias said audio driver stage across its input diode such that when said first audio stage is acting as an audio amplifier said audio driver will also amplify audio, said means to bias said first audio stage being of component value such that when said D.C. amplifier is in cut-off condition, said audio amplifier is driven into current saturation such that increase in output current in its collector current makes the base of said audio driver stage more negative than the emitter of said audio driver stage to assure cut-off of said audio driver stage and reduction of gain compared to the amplifying condition of said audio stages, the presence of audio signals causing decreased noise input to said noise amplifier thereby causing relatively low output of said noise rectifier such that said D.C. amplifier turns said audio amplifier on and unsquelches the receiver.

10. In an FM receiver an audio amplifier incorporating a squelch circuit, said amplifier comprising an audio driver stage, a first audio stage, a D.C. amplifier stage and a noise amplifier stage, means to apply input from the FM receiver discriminator both to said noise amplifier and said first audio stage, filter means disposed between said noise amplifier and said D.C. amplifier, said filter means being resonant to a maximum response of substantially six kilocycles to prevent voice signals from being passed to the D.C. amplifier and squelching the receiver, said audio driver being responsive to output from said first audio stage, said first audio stage being responsive to output from said D.C. amplifier, said D.C. amplifier being responsive to output from said noise amplifier, means to rectify the output of said noise amplifier, means responsive to said rectified noise to bias said first audio stage such that in the presence of output from said D.C. amplifier of a predetermined level said first audio stage will be driven into saturation and means to bias said audio driver such that upon said first audio stage being driven into saturation said audio driver will be cut off to thereby cause squelching of the receiver, greater noise from said discriminator occurring in the absence of voice audio input to said first audio stage such that rectification and amplification of said noise by said D.C. amplifier causes said first audio stage to be operated below current saturation to thereby permit audio amplification to take place.

11. An audio amplifier and squelch circuit comprising a first audio amplifier stage responsive to audio input, an audio driver stage responsive to said first audio stage, said first audio stage and said audio driver stage each comprising a transistor having an input diode, bias bleeder means to bias said audio driver across its input diode such that upon conduction to saturation of said first audio stage said audio driver will cut off and upon conduction below saturation of said first audio stage said audio driver will amplify signals, a squelch circuit to selectively drive said first audio amplifier into and out of saturation, said squelch circuit comprising a noise amplifier, squelch control means to control the gain of said noise amplifier, said noise amplifier being responsive to noise input in the absence of audio input to amplify noise signals, a rectifier circuit to rectify output of said noise amplifier, a D.C. amplifier responsive to said rectified noise and comprising a transistor having an input diode, biasing means to bias said D.C. amplifier across its input diode in accordance with said rectified noise such as to provide an output voltage in the presence of noise to drive said first audio stage into saturation, said D.C. amplifier providing a voltage level ouptu in the presence of audio such that said first audio stage is operated below current saturation.

12. The apparatus of claim 11 wherein said noise amplifier stage comprises a PNP transistor and said D.C. amplifier, first audio and audio driver stages each comprise NPN transistors, said audio amplifier thereby drawing current only when said audio driver stage is conducting to provide a class A amplifier which is turned off when the receiver is squelched.

13. The apparatus of claim 12 including means for discriminating between noise voltage and audio voltage to exclude audio voltage signals from squelching said amplifier portion of the receiver.

14. The apparatus of claim 13 wherein said rectifier comprises a pair of silicon diodes thereby improving sharpness of audio turn off and on and permitting selective squelch and audio action with relatively small change in signal input to the receiver.

15. In an audio amplifier channel of the type which includes a noise squelch circuit for said channel, the combination comprising an audio amplifying stage, a first input terminal for said audio amplifying stage having audio signal impressed thereon, unidirectional amplifying means having input and output circuit means, means coupling the output circuit of said unidirectional amplifying means to said audio amplifying stage for controlling said audio amplifying stage by selectively biasing it into and out of a saturated condition in response to discrete unidirectional voltage levels, a second input terminal having a noise signal impressed thereon, unidirectional conducting means coupled to said input terminal for producing a unidirectional voltage in response to said noise signal, means coupling said unidirectional voltage to said D.C. amplifying means for producing said discrete voltage levels and thereby saturating said amplifying stage in presence of noise at said second input terminal.

References Cited in the file of this patent

UNITED STATES PATENTS

| | | |
|---|---|---|
| 2,808,507 | Pawlowski | Oct. 1, 1957 |
| 2,840,699 | Carpenter | June 24, 1958 |
| 2,904,678 | Malchow | Sept. 15, 1959 |
| 2,912,571 | Jacobsen | Nov. 10, 1959 |
| 2,912,573 | Mitchell | Nov. 10, 1959 |
| 2,915,603 | Jacobsen | Dec. 1, 1959 |
| 2,930,890 | Lenk | Mar. 29, 1960 |
| 2,941,046 | Pokrant | June 14, 1960 |